(12) United States Patent
Kitaya et al.

(10) Patent No.: US 9,332,194 B2
(45) Date of Patent: May 3, 2016

(54) IMAGING APPARATUS FOR OBTAINING A USER-INTENDED IMAGE WHEN ORIENTATION OF THE IMAGING APPARATUS CHANGES IN APPLYING A SPECIAL EFFECT THAT CHANGES THE IMAGE QUALITY IN A SET DIRECTION

(71) Applicant: CANON KABUSHIKI KAISHA, Tokyo (JP)

(72) Inventors: Koki Kitaya, Kawasaki (JP); Akiharu Ito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/036,478

(22) Filed: Sep. 25, 2013

(65) Prior Publication Data

US 2014/0022415 A1   Jan. 23, 2014

Related U.S. Application Data

(63) Continuation of application No. 13/018,251, filed on Jan. 31, 2011, now Pat. No. 8,570,402.

(30) Foreign Application Priority Data

Feb. 5, 2010  (JP) ................................ 2010-024601
Feb. 5, 2010  (JP) ................................ 2010-024602

(51) Int. Cl.
   *H04N 5/262*    (2006.01)
   *H04N 5/232*    (2006.01)
   *G06T 1/00*     (2006.01)
   *H04N 9/74*     (2006.01)

(52) U.S. Cl.
   CPC  *H04N 5/262* (2013.01); *G06T 1/00* (2013.01); *H04N 5/232* (2013.01); *H04N 5/23245* (2013.01); *H04N 5/2621* (2013.01); *H04N 9/74* (2013.01)

(58) Field of Classification Search
   USPC ........................................................ 345/158
   See application file for complete search history.

(56) References Cited

U.S. PATENT DOCUMENTS

| | | | |
|---|---|---|---|
| 6,621,524 B1 * | 9/2003 | Iijima et al. | 348/584 |
| 8,194,147 B2 * | 6/2012 | Hsiao et al. | 348/222.1 |
| 2003/0193568 A1 * | 10/2003 | Yoshida et al. | 348/207.1 |

(Continued)

FOREIGN PATENT DOCUMENTS

| | | |
|---|---|---|
| JP | 10107999 A | 4/1998 |
| JP | 11326983 A | 11/1999 |
| JP | 2008118348 A | 5/2008 |

*Primary Examiner* — Roberto Velez
*Assistant Examiner* — Quan Pham
(74) *Attorney, Agent, or Firm* — Canon U.S.A., Inc. IP Division

(57) ABSTRACT

An imaging apparatus includes a display unit capable of performing through display for displaying in real time a captured image, a control unit configured to cause, while the through display is being performed, the imaging unit to capture a still image in response to an instruction for a shooting preparation and a subsequent instruction for a shooting operation, an image processing unit configured to apply a special effect for changing image quality in a set direction to the captured image subjected to through display, a detection unit configured to detect an orientation of the imaging apparatus, and a setting unit configured to set the direction of the special effect according to the detected orientation, wherein, during a period for which an operation input for the shooting preparation continues, the setting unit retains the setting of the direction of the special effect even when the detected orientation changes.

41 Claims, 14 Drawing Sheets

(56) References Cited

U.S. PATENT DOCUMENTS

| | | | |
|---|---|---|---|
| 2008/0037839 A1* | 2/2008 | Corcoran et al. | 382/118 |
| 2008/0240517 A1* | 10/2008 | Okamoto | 382/118 |
| 2009/0002391 A1* | 1/2009 | Williamson et al. | 345/619 |
| 2009/0040321 A1* | 2/2009 | Nakamura | 348/208.11 |
| 2009/0066730 A1* | 3/2009 | Mikawa | 345/661 |
| 2009/0096897 A1* | 4/2009 | Saito | 348/241 |
| 2009/0102750 A1* | 4/2009 | Doi | 345/55 |
| 2009/0207184 A1* | 8/2009 | Laine et al. | 345/619 |
| 2010/0066751 A1* | 3/2010 | Ryu et al. | 345/581 |

* cited by examiner

IMAGING APPARATUS FOR OBTAINING A USER-INTENDED IMAGE WHEN ORIENTATION OF THE IMAGING APPARATUS CHANGES IN APPLYING A SPECIAL EFFECT THAT CHANGES THE IMAGE QUALITY IN A SET DIRECTION

This application is a continuation application of U.S. application Ser. No. 13/018,251 filed Jan. 31, 2011, which claims priority from Japanese Patent Applications No. 2010-024601 filed Feb. 5, 2010 and No. 2010-024602 filed Feb. 5, 2010, which are hereby incorporated by reference herein in their entirety.

BACKGROUND OF THE INVENTION

1. Field of the Invention

The present invention relates to special effect processing for an image captured by an imaging apparatus.

2. Description of the Related Art

In recent years, there has been an increasing demand for easily capturing, by using an imaging apparatus such as a digital camera, more unique images that could have conventionally been captured only by using various apparatuses or making full use of techniques of a skilled photographer. To meet this demand, Japanese Patent No. 04155419 discusses a technique for easily generating a unique image by applying digital special effects to a captured image. The technique applies a special effect to the image when performing through display of a subject before shooting on a display such as a liquid crystal display (LCD). When the direction matters in the special effect, the technique enables a user to change the direction of the special effect as required and to capture an image while monitoring the special effect.

SUMMARY OF THE INVENTION

The present invention is directed to an imaging apparatus capable of obtaining a user-intended image even when the orientation of the imaging apparatus changes in applying such a special effect that changes the image quality in a set direction.

According to an aspect of the present invention, an imaging apparatus includes a display unit configured to perform through display for displaying in real time an image captured by an imaging unit, a control unit configured to cause, while the through display is being performed by the display unit, the imaging unit to capture a still image in response to an instruction for a shooting preparation including setting of a shooting condition and a subsequent instruction for a shooting operation, an image processing unit configured to apply a special effect for changing image quality in a set direction to the captured image subjected to through display, a detection unit configured to detect an orientation of the imaging apparatus, and a setting unit configured to set the direction of the special effect applied by the image processing unit according to the orientation detected by the detection unit, wherein, during a period for which an operation input for the shooting preparation continues, the setting unit retains the setting of the direction of the special effect even when the orientation detected by the detection unit changes.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

When applying such a special effect that changes the image quality in a set direction, a change in the orientation of a digital camera makes the direction of the special effect inconsistent with a captured image even if a subject remains unchanged. To avoid this, a first exemplary embodiment of the present invention, in applying such a special effect that changes the image quality in a set direction, enables obtaining a user-intended image even if the orientation of an imaging apparatus changes.

Figure 1A:
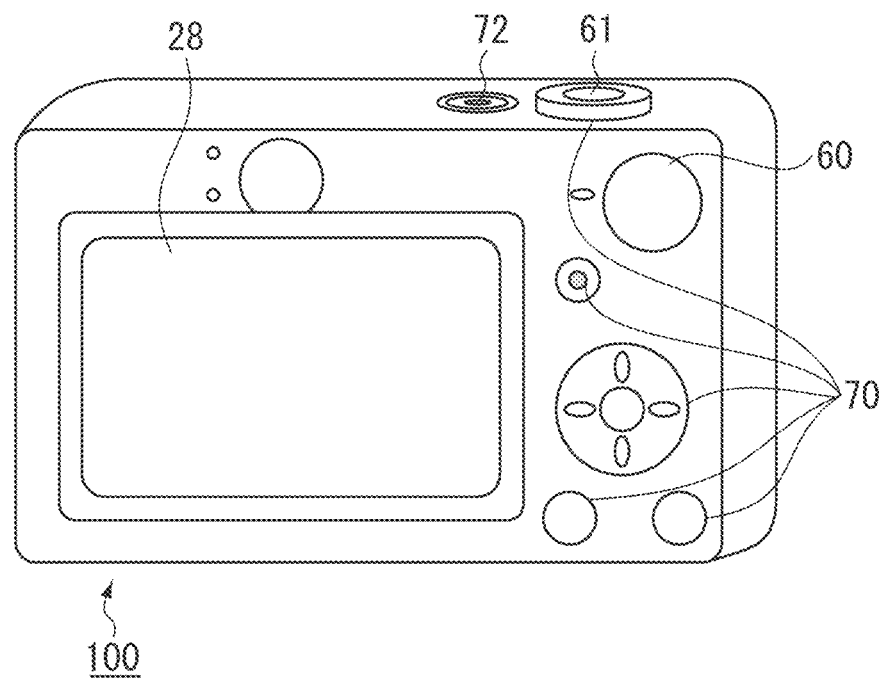
FIGS. 1A and 1B respectively illustrate an external view and configuration of a digital camera according to a first exemplary embodiment of the present invention.

The present exemplary embodiment will be described below based on a case where the present invention is applied to a digital camera which is an imaging apparatus. FIG. 1A illustrates an external view of a digital camera 100 according to the present exemplary embodiment. Referring to FIG. 1A, the digital camera 100 includes a display unit 28, a power switch 72, a shutter button 61, a mode dial 60, and an operation unit 70. The display unit 28 displays an image and various pieces of information. The power switch 72 turns the power ON and OFF. The mode dial 60 selects various modes of the digital camera 100. More specifically, the mode dial 60 enables selection of an operation mode such as the still image recording mode, moving image recording mode, and playback mode. The operation unit 70 is provided with various buttons for receiving various user operations.

Figure 1B:
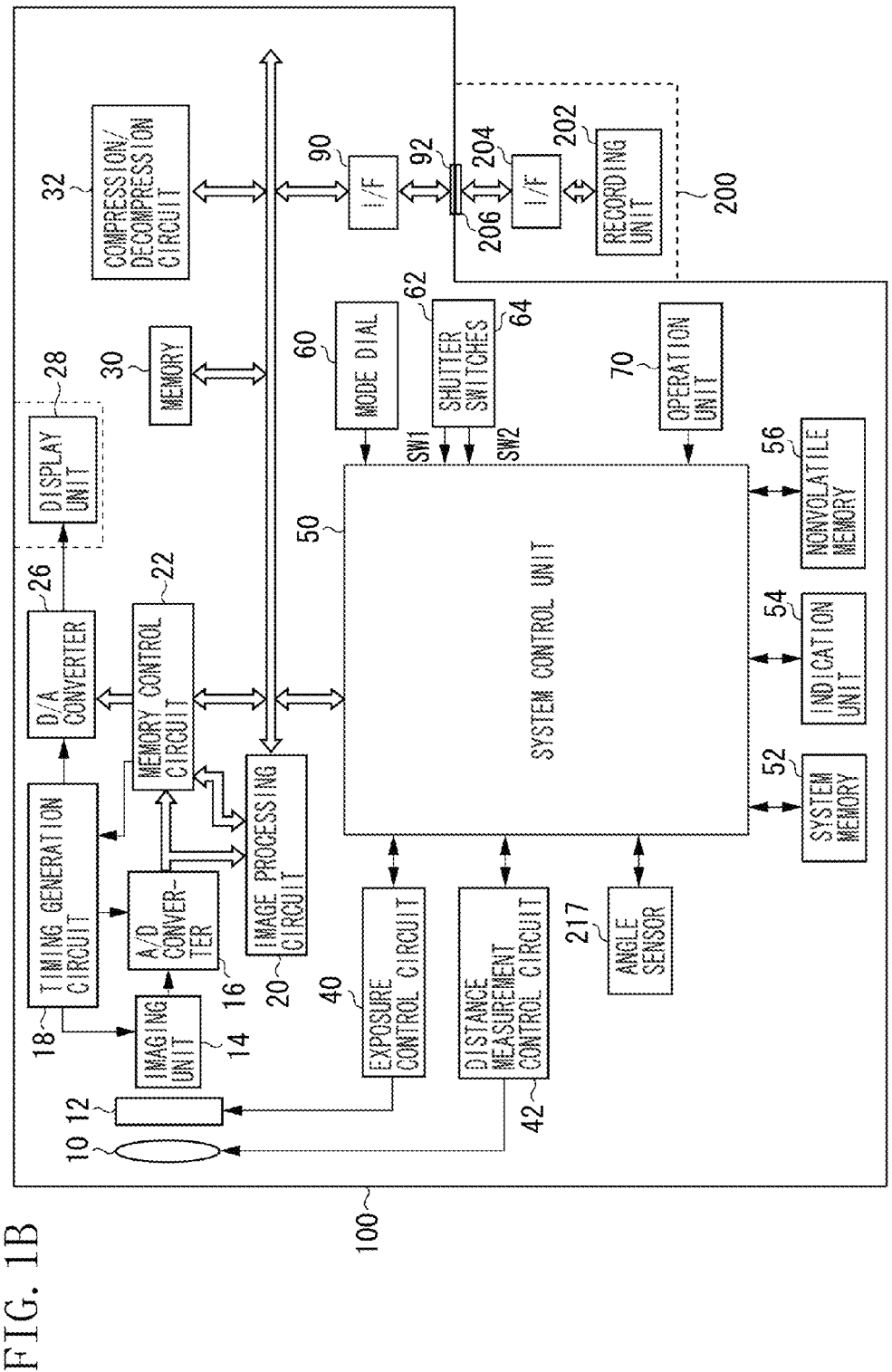

FIG. 1B is a block diagram illustrating an exemplary configuration of the digital camera 100 according to the present exemplary embodiment. Referring to FIG. 1B, the digital camera 100 includes a photographic lens 10 and a shutter 12 having a diaphragm function. An imaging unit 14 includes a charge-coupled device (CCD) or complementary metal oxide semiconductor (CMOS) element for converting an optical image into an electrical signal. An analog-to-digital (A/D) converter 16 converts an analog signal into a digital signal. A timing generation circuit 18 supplies a clock signal and control signal to the imaging unit 14, the A/D converter 16, and a digital-to-analog (D/A) converter 26. The timing generation circuit 18 is controlled by a memory control circuit 22 and a system control unit 50. An image processing circuit 20 applies predetermined pixel interpolating processing, resize processing such as reduction, and color conversion processing to data from the A/D converter 16 and data from the memory control circuit 22. The image processing circuit 20 performs predetermined calculation processing by using the captured image data. The system control unit 50 performs exposure control and distance measurement control based on an obtained calculation result. The image processing circuit 20 performs predetermined calculation processing by using the captured image data as well as through-the-lens (TTL)-based automatic white balance (AWB) processing based on the obtained calculation result. In the present exemplary embodiment, data from the A/D converter 16 having undergone pixel interpolating processing is referred to as RAW data. The RAW data having undergone development processing such as white balance processing and color conversion processing is subjected to the diorama effect image processing (described below).

Data output from the A/D converter 16 is stored in memory 30 via the image processing circuit 20 and the memory control circuit 22 or directly stored therein via the memory control circuit 22. The memory 30 stores image data obtained by the imaging unit 14 and converted into digital data by the A/D converter 16 as well as image data to be displayed on the display unit 28. The memory 30 is also used to store a file header when forming still image, moving image, and image files. A compression/decompression circuit 32 compresses image data through the adaptive discrete cosine transform (ADCT). The compression/decompression circuit 32 reads a captured image stored in the memory 30 by using a shutter 12 as a trigger, applies compression processing to the captured image, and stores the compressed data in the memory 30. Then, the compression/decompression circuit 32 applies decompression processing to the compressed image read from a recording unit 202 of a recording medium 200 into the memory 30, and stores the decompressed data in the memory 30. The image data stored in the memory 30 by the compression/decompression circuit 32 is filed by a file unit of the system control unit 50, and then recorded in the recording medium 200 via an interface (I/F) 90. The memory 30 also serves as image display memory (video memory). The D/A converter 26 converts the data for image display stored in the memory 30 into an analog signal and supplies it to the display unit 28. The display unit 28 displays data related to the analog signal from the A/D converter 26 on a display such as an LCD.

Nonvolatile memory 56 is electrically erasable recordable memory such as electrically erasable programmable read-only memory (EEPROM). The nonvolatile memory 56 stores operation constants and programs of the system control unit 50. Programs refer to programs for executing various flow charts (described below) in the present exemplary embodiment. The system control unit 50 totally controls the digital camera 100. The system control unit 50 executes programs stored in the nonvolatile memory 56 to achieve each piece of processing according to the present exemplary embodiment described below. Random access memory (RAM) is used as system memory 52. Operation constants and variables of the system control unit 50 and programs read from the nonvolatile memory 56 are loaded into the system memory 52.

The mode dial 60 enables selecting an operation mode of the system control unit 50: the still image recording mode, moving image recording mode, or playback mode. When a user half-presses the shutter button 61 provided on the digital camera 100 (half-pressing is an instruction for a shooting preparation), a first shutter switch 62 turns ON to generate a first shutter switch signal SW1. Upon reception of the first shutter switch signal SW1, the system control unit 50 starts a sequence of the shooting preparation including setting of a shooting condition, such as auto focus (AF) processing, automatic exposure (AE) processing, automatic white balance (AWB) processing, and electronic flash preliminary emission (EF) processing. When the operation of the shutter button 61 is completed or fully pressed (full-pressing is an instruction for a shooting operation), a second shutter switch 64 turns ON to generate a second shutter switch signal SW2. Upon reception of the second shutter switch signal SW2, the system control unit 50 starts a sequence of the shooting operation ranging from reading a signal from the imaging unit 14 to storing image data in the recording medium 200.

The I/F 90 is used to communicate with the recording medium 200, such as a memory card or a hard disk. A connector 92 is used to connect between the recording medium 200 and the I/F 90. The recording medium 200, such as a memory card or a hard disk, includes the recording unit 202 including semiconductor memory, a magnetic disk, etc.; an I/F 204 for interfacing with the digital camera 100; and a connector 206 for connecting the recording medium 200 and the digital camera 100. An angle sensor 217 can detect a three-dimensional motion of the digital camera 100. Although the angle sensor 217 outputs either an analog signal which is captured via an A/D converter or a digital signal which is captured via serial communication. The system control unit 50 applies signal processing and determination processing to a captured rotation angle signal to recognize that the imaging apparatus is rotated, and performs a relevant function according to the rotational direction. Such functions include a function of storing the orientation of a captured image and a function of changing the angle of a processing effect on the captured image.

Figure 2:
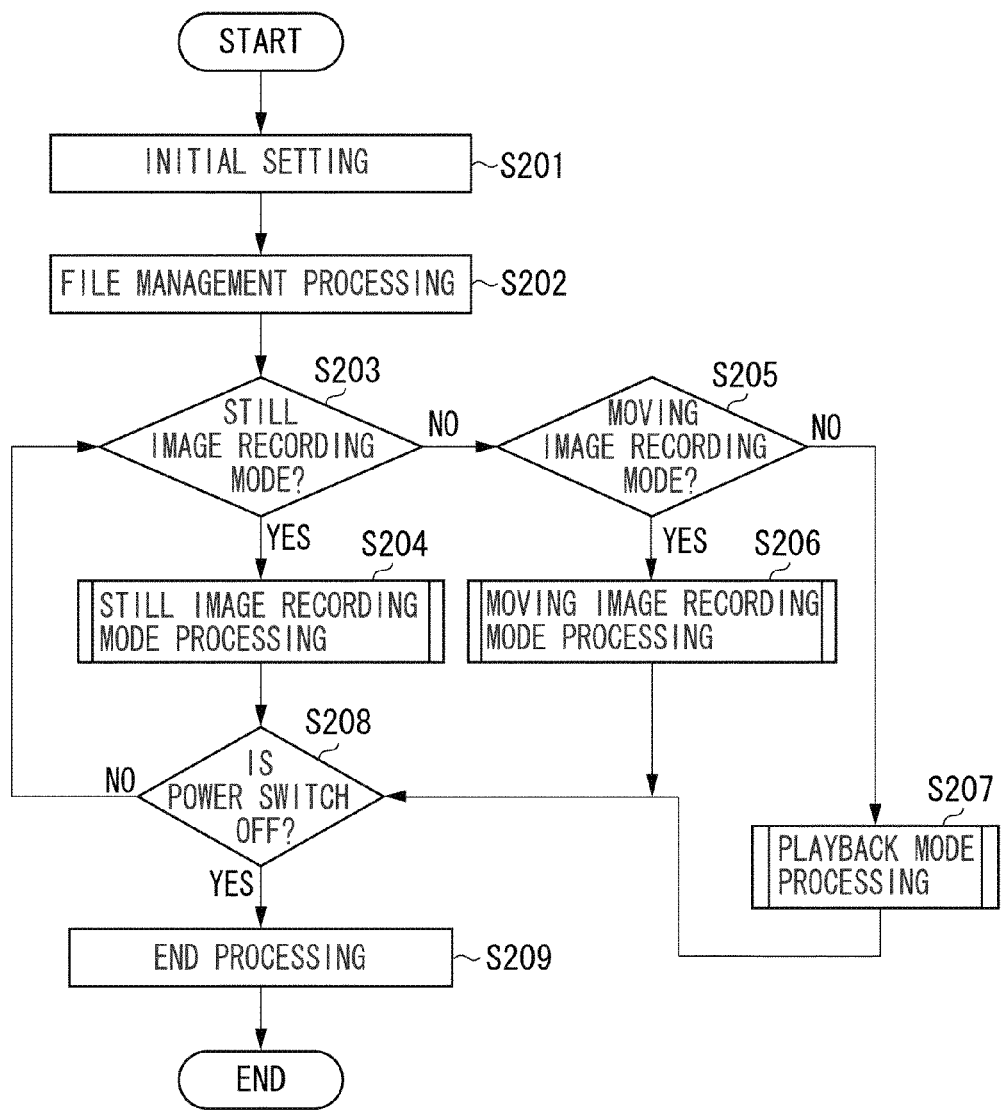
FIG. 2 is a flow chart illustrating an overall operation of the digital camera.

FIG. 2 is a flow chart illustrating an overall operation of the digital camera 100 according to the present exemplary embodiment. Each piece of processing of this flow chart is achieved when the system control unit 50 loads a relevant program from the nonvolatile memory 56 into the system memory 52 and then executes it.

When the power switch 72 is operated and the power turns ON, in step S201, the system control unit 50 initializes flags, control variables, and so on. In step S202, the system control unit 50 starts management processing for files recorded on the recording medium 200. When the mode dial 60 is set to the still image recording mode (YES in step S203), the processing proceeds to step S204. In step S204, the system control unit 50 performs still image recording mode processing. When the mode dial 60 is set to the moving image recording mode (NO in step S203 and YES in step S205), the processing proceeds to step S206. In step S206, the system control unit 50 performs moving image recording mode processing. When the mode dial 60 is set to the playback mode (NO in step S203 and NO in step S205), the processing proceeds to step S207. In step S207, the system control unit 50 performs playback mode processing.

After the system control unit 50 completes processing in response to the mode setting of the mode dial 60 in step S204, S206, or S207, the processing proceeds to step S208. In step S208, the system control unit 50 determines the setting position of the power switch 72. When the power switch 72 is set to ON (NO in step S208), the processing returns to step S203. Otherwise, when the power switch 72 is set to OFF (YES in step S208), the processing proceeds to step S209. In step S209, the system control unit 50 changes the display of the display unit 28 to the end state and performs other end processing. When the end processing in step S209 is completed, the processing ends and the power turns OFF.

Figure 3:
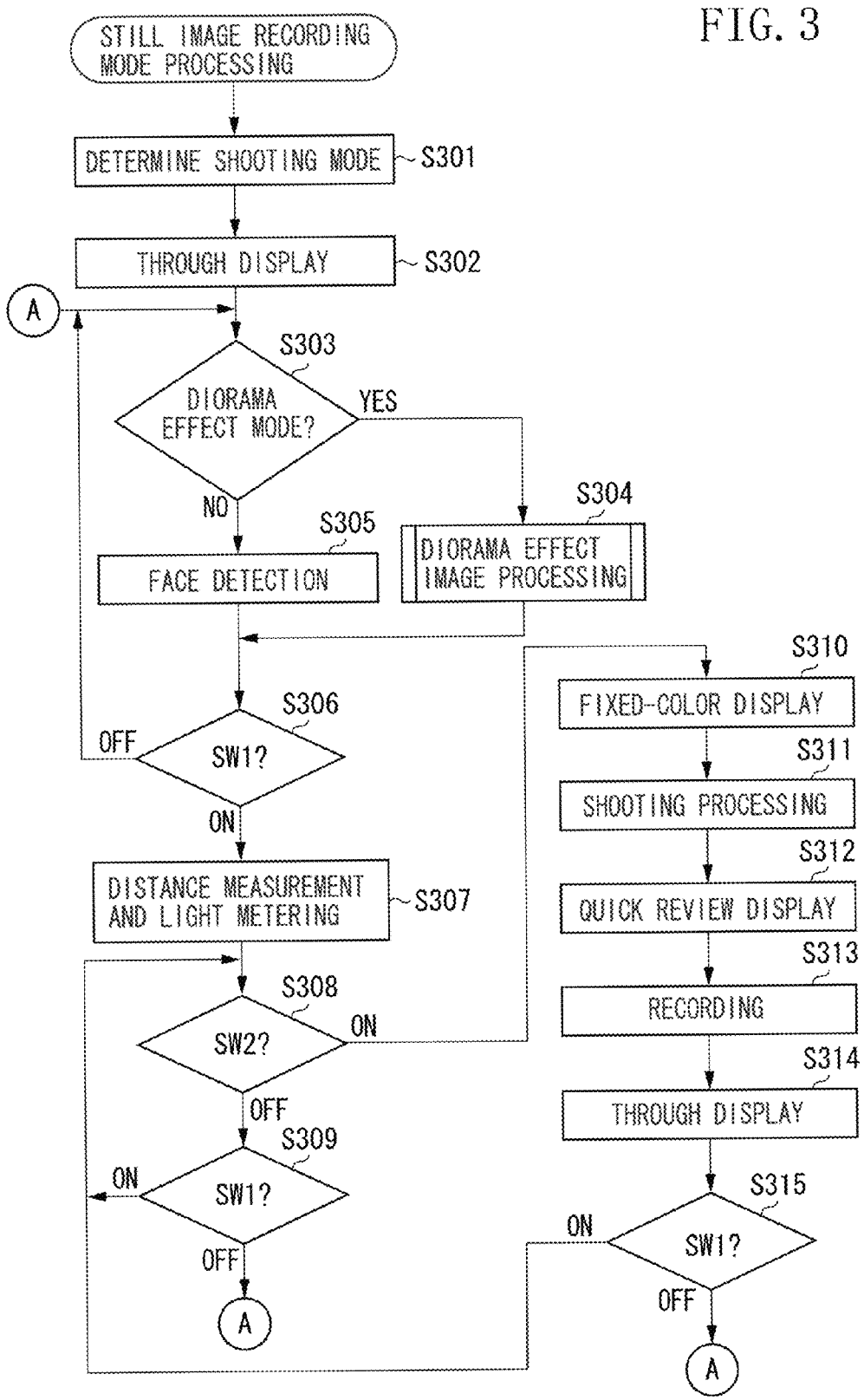
FIG. 3 is a flow chart illustrating processing in a still image recording mode of the digital camera.

FIG. 3 is a flow chart illustrating a shooting control operation in the still image recording mode, i.e., detailed processing of above-mentioned step S204 in FIG. 2. Each step in the shooting control operation in the still image recording mode is achieved when the system control unit 50 loads a relevant program from the nonvolatile memory 56 into the system memory 52 and then executes it. The still image recording mode processing illustrated in FIG. 3 will be ended through interruption processing, etc. when any other mode is selected with the mode dial 60 or when the power switch 72 is set to OFF.

After starting the still image recording mode, in step S301, the system control unit 50 determines the shooting mode. The system control unit 50 determines the shooting mode by acquiring from the nonvolatile memory 56 the shooting mode selected when the last still image recording mode was ended and storing it in the system memory 52. The shooting mode refers to a mode for shooting a still image. The digital camera 100 according to the present exemplary embodiment is provided with the following shooting modes:
(1) Auto mode: A mode in which various parameters of the camera are automatically determined based on a measured exposure value by a program installed in the digital camera 100.
(2) Manual mode: A mode in which various parameters of the camera can be arbitrarily changed by a user.
(3) Scene mode: A mode in which a combination of the shutter speed, aperture value, flash emission state, sensitivity setting, etc., suitable for a shooting scene is automatically set.

A diorama effect mode is a kind of the scene mode. After determination of the shooting mode, in step S302, the system control unit 50 performs through display of image data from the imaging unit 14. Through display refers to displaying on the display unit 28 an image currently being captured by the imaging unit 14 as a moving image almost in real time without recording it in the recording medium 200. Through display enables a user to check the viewing angle and adjust the timing of shooting.

In step S303, the system control unit 50 determines whether the shooting mode determined in step S301 is the diorama effect mode in units of a predetermined number of frames during through display. When the system control unit 50 determines that the shooting mode is the diorama effect mode (YES in step S303), the processing proceeds to step S304. In step S304, the system control unit 50 performs the diorama effect image processing. The diorama effect image processing will be described below with reference to FIG. 4. When step S304 is completed, the processing proceeds to step S306. Otherwise, when the system control unit 50 determines that the shooting mode is not the diorama effect mode (NO in step S303), the processing proceeds to step S305.

In step S305, the system control unit 50 performs face detection for detecting whether the image signal for through display includes one or more human faces. When one or more human faces are detected in the face detection processing, the system control unit 50 stores, in the system memory 52, the position coordinates, size (width and height), and number of faces detected in the image signal, and a reliability factor as face information. When no human face is detected in the face detection processing, the system control unit 50 sets zero to areas for the position coordinates, size (width and height), number of detected faces, and a reliability factor in the system memory 52.

In step S306, the system control unit 50 determines whether the first shutter switch signal SW1 turns ON. When the first shutter switch signal SW1 is OFF (OFF in step S306), the processing returns to step S303. Otherwise, when the first shutter switch signal SW1 is ON (ON in step S306), the processing proceeds to step S307.

In step S307, the system control unit 50 performs the shooting preparation. The system control unit 50 performs distance measurement processing and activates a distance measurement control circuit 42 to adjust the focus of the photographic lens 10 with a subject. The system control unit 50 also performs light metering processing and activates an exposure control circuit 40 to determine the aperture value and shutter speed. When one or more faces are detected in step S305, the control unit 50 can also perform face AF for performing distance measurement in a range of the detected face.

In steps S308 and S309, the system control unit 50 determines the ON/OFF state of the first shutter switch signal SW1 and the second shutter switch signal SW2. When the second shutter switch signal SW2 turns ON while the first shutter switch signal SW1 is ON (ON in step S308), the processing proceeds to step S310 from step S308. When the first shutter switch signal SW1 turns OFF while the second shutter switch signal SW2 is OFF (OFF in step S309), the processing returns to step S303 from step S309. While the first shutter switch signal SW1 is ON and the second shutter switch signal SW2 is OFF (ON in step S309), the processing repeats steps S308 and S309.

When the second shutter switch signal SW2 turns ON, then in step S310, the system control unit 50 changes the display state of the display unit 28 from through display to fixed color display, for example, black display. In step S311, the system control unit 50 performs shooting processing including exposure processing and development processing. In exposure processing, image data obtained via the imaging unit 14 and the A/D converter 16 is stored in the memory 30 via the image processing circuit 20 and the memory control circuit 22 or directly from the A/D converter 16 via the memory control unit 22. In development processing, the system control unit 50 reads the stored image data from the memory 30 by using the image processing circuit 20 and, as required, the memory control circuit 22, and performs various pieces of processing. Specifically, when face detection is performed in step S305, the control unit 50 performs development processing according to a result of face detection. On the other hand, when display and setting for the diorama effect image processing are performed in step S304 and then a main shooting operation is performed with the display and setting, the system control unit 50 also performs the diorama effect image processing including blur image processing in step S407 (described below) according to a direction setting stored in step S409 (described below).

In step S312, the system control unit 50 performs quick review display for the image data obtained in shooting processing on the display unit 28. Quick review display refers to displaying, on the display unit 28, image data for a predetermined period of time (review time), after shooting a subject and before recording an image in a recording medium, to check the captured image. In step S313, the system control unit 50 performs recording processing to store, in an image file in the recording medium 200, the image data obtained in shooting processing. As image data obtained in shooting processing, the system control unit 50 records the image data having undergone compression processing by the compression/decompression circuit 32 after development processing. However, the image data can also be recorded in the RAW data format by user selection.

In step S314, the system control unit 50 returns the display state of the display unit 28 from quick review display to through display. After checking the captured image data through quick review display, the processing in step S314 automatically changes the display state of the display unit 28 to through display for sequentially displaying the image data from the imaging unit 14 for subsequent shooting.

In step S315, the system control unit 50 determines the ON/OFF state of the first shutter switch signal SW1. When the first shutter switch signal SW1 is ON (ON in step S315), the processing returns to step S308. Otherwise (OFF in step S315), the processing returns to step S303. Specifically, when the half-pressing state of the shutter button 61 is retained (the first shutter switch signal SW1 is ON), then in step S308, the system control unit 50 prepares for subsequent shooting. Otherwise, when the shutter button 61 is released (the first shutter switch signal SW1 turns OFF), the system control unit 50 completes a sequence of the shooting operation and the processing returns to the shooting standby state (step S303).

Figure 4:
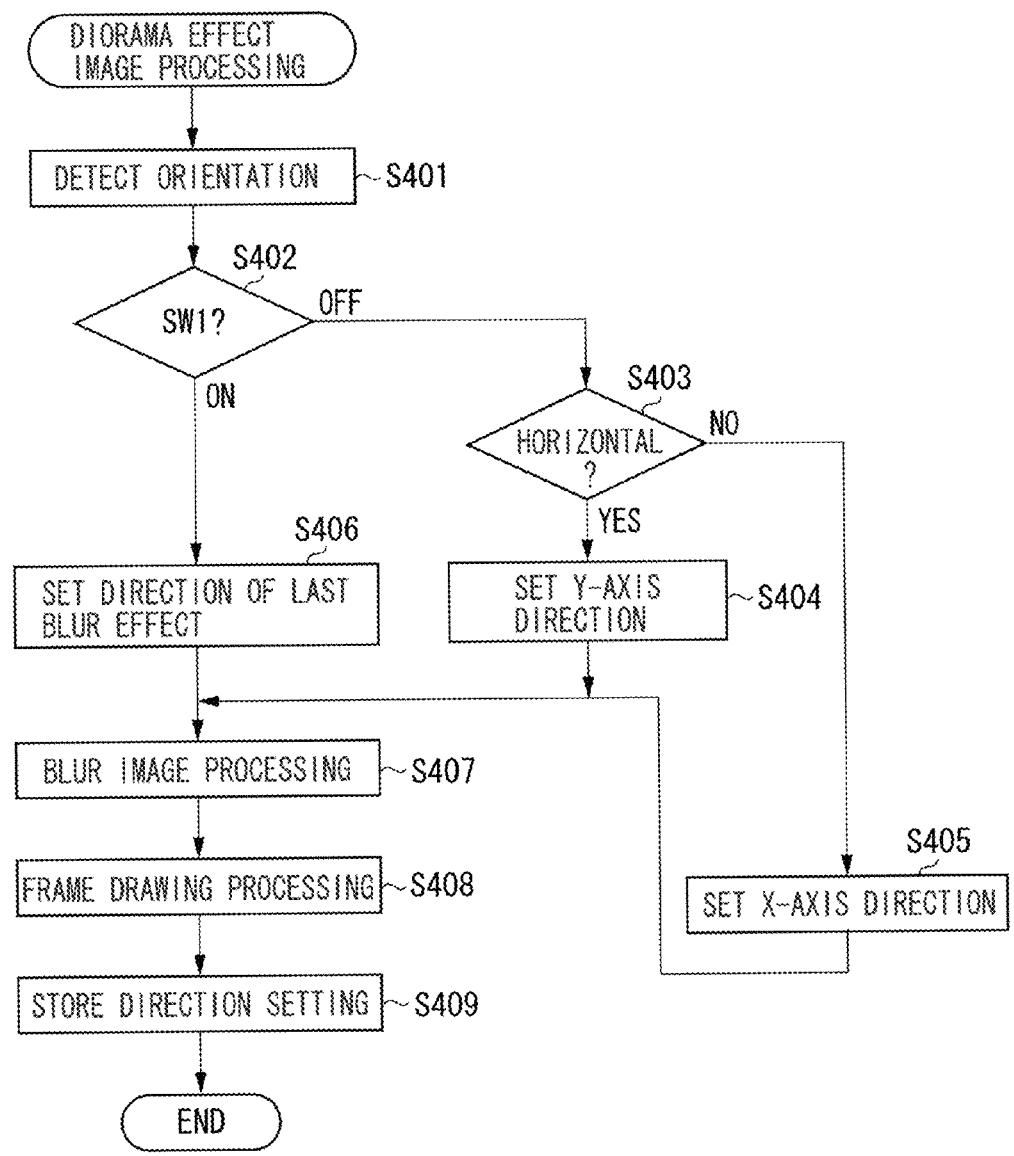
FIG. 4 is a flow chart illustrating a flow of diorama effect image processing.
Figure 5A:
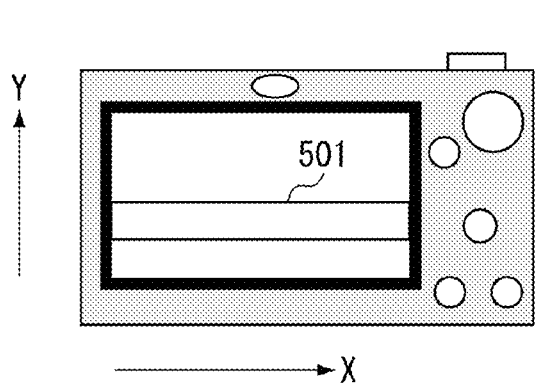
FIGS. 5A to 5D illustrate diorama effects and relevant frame displays.
Figure 5C:
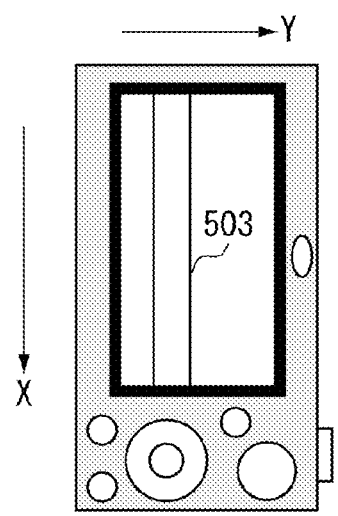
Figure 5B:
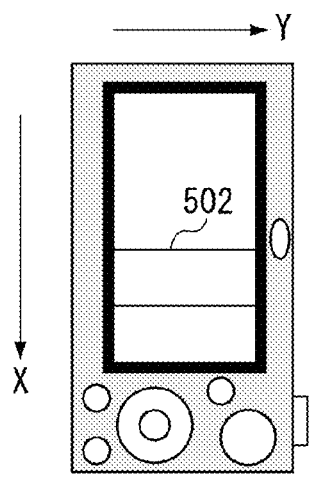

FIG. 4 is a flow chart illustrating the diorama effect image processing, i.e., detailed processing in step S304 in FIG. 3. The diorama effect image processing refers to processing for blurring a specified range to provide a feeling of distance. When the digital camera 100 is horizontal (landscape-oriented), the angle sensor 217 detects the horizontal state and the system control unit 50 applies blur effect in the Y-axis direction (height direction) to the display unit 28. Referring to FIG. 5A, an area in a frame 501 is not subjected to blur effect (the captured image displayed without blur), and areas other than the frame 501 are subjected to blur effect. Referring to FIG. 5B, when the orientation of the digital camera 100 is changed by 90 degrees to be vertical (portrait-oriented), the angle sensor 217 detects the vertical state and the system control unit 50 applies blur effect in the X-axis direction (width direction) to the display unit 28. Each piece of processing of the following diorama effect image processing is achieved when the system control unit 50 loads a relevant program from the nonvolatile memory 56 into the system memory 52 and then executes it.

In step S401, the system control unit 50 detects the current orientation of the digital camera 100 (hereinafter simply referred to as orientation) by using the angle sensor 217. In step S402, the system control unit 50 determines the ON/OFF state of the first shutter switch signal SW1. When the first shutter switch signal SW1 is ON (ON in step S402), the processing proceeds to step S406. Otherwise (OFF in step S402), the processing proceeds to step S403.

In step S403 (when the first shutter switch signal SW1 is OFF), the system control unit 50 determines whether the orientation detected in step S401 is horizontal. When the detected orientation is horizontal (YES in step S403), the processing proceeds to step S404. In step S404, the system control unit 50 sets the direction of blur effect to the Y-axis direction. Otherwise, when the orientation detected in step S401 is vertical (NO in step S403), the processing proceeds to step S405. In step S405, the system control unit 50 sets the direction of blur effect to the X-axis direction.

When the first shutter switch signal SW1 is ON, then in step S406, the system control unit 50 sets the direction of the last blur effect stored in the system memory 52 regardless of the currently detected orientation.

When the direction of blur effect is set, then in step S407, the system control unit 50 applies blur image processing to the captured image based on the set direction of blur effect. In the present exemplary embodiment, the image processing circuit 20 first applies thinning-out processing to the captured image after development processing to reduce it and then enlarges the reduced image back to the original size, thus generating a blur image. Then, the system control unit 50 applies trimming processing to the frame area corresponding to the set direction of blur effect, and pastes the frame area onto the generated blur image. As a result, the diorama effect is given to the entire captured image with which the frame area is not blurred and areas other than the frame area are blurred.

In step S408, the system control unit 50 performs monochrome drawing processing for drawing a frame on the obtained image with diorama effect, and displays on the display unit 28 a through image as illustrated in FIG. 5A or 5B. FIG. 5A illustrates an exemplary through image corresponding to the Y-axis direction set in step S404. FIG. 5B illustrates an exemplary through image corresponding to the X-axis direction set in step S405. In step S409, the system control unit 50 stores in the system memory 52 a result of any one of setting processing of steps S404 to S406, and ends the diorama effect image processing.

Figure 5D:
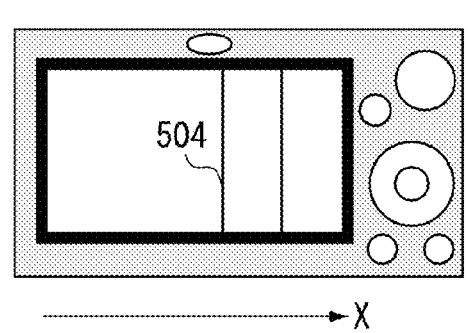

Applying the above processing enables dynamically changing the direction of blur effect in the diorama effect image processing in units of a predetermined number of frames according to the detected orientation at the time of through display. When the first shutter switch signal SW1 is ON, the system control unit 50 performs setting control for maintaining the last direction setting regardless of the detected orientation. Specifically, when the user starts half-pressing the shutter button 61, the direction of the diorama effect image processing is locked. This lock state is retained while the user keeps half-pressing the shutter button 61. FIG. 5C illustrates an exemplary frame display while the user keeps half-pressing the shutter button 61 in the state in FIG. 5A to lock the direction of the diorama effect. The frame 501 does not rotate as illustrated by a frame 502 in FIG. 5B, but remains unchanged (remains horizontal) as illustrated by a frame 503. FIG. 5D illustrates an exemplary frame display while the user keeps half-pressing the shutter button 61 in the state in FIG. 5B to lock the direction of the diorama effect. The frame 502 does not rotate as illustrated by the frame 501 in FIG. 5A, but remains unchanged (remains horizontal) as illustrated by the frame 504.

Therefore, when the user uses the digital camera 100 with the vertical (portrait) orientation and wants to keep the diorama effect in the horizontal direction, the user only needs to rotate the camera. When the user wants to apply the diorama effect in the vertical direction, the user needs to half-press the shutter button 61 to lock the direction of the diorama effect and then to rotate the digital camera 100 by 90 degrees. Thus, the direction of the diorama effect is locked, and the diorama effect is applied in the vertical direction. When the user half-presses the shutter button 61 (SW1), the system control unit 50 also simultaneously performs a sequence of the shooting preparation such as AF setting and AE setting, independently of the screen processing.

As described above, since the user can intentionally set the diorama effect associated with the orientation during a sequence of the shooting operation, the present exemplary embodiment can improve operability and enable unique imaging in a simple way.

In the first exemplary embodiment, the setting in the diorama effect image processing in step S304 in FIG. 3 is reflected as it is to a main shooting operation in step S311.

Therefore, a similar effect to the one acquired in step S304 can be obtained also in the captured and recorded image. When the user full-presses the shutter button 61 (SW2) while the direction of the diorama effect is locked by half-pressing the shutter button 61 (SW1), a still image is captured and then recorded. Thus, the recorded image has a similar arrangement relation to that illustrated in FIG. 5C or 5D.

In a second exemplary embodiment of the present invention, the system control unit 50 also records information about the direction setting of diorama processing in a header of a file of a generated still image together with the detected orientation. Thus, in playing back the file after transferring it to the digital camera 100 or personal computer, when the detected orientation is horizontal, the recorded image can be played back as it is. When the detected orientation is vertical, the recorded image can be rotated by 90 degrees before display. Further, prior to playback, the recorded image can also be classified as a vertically-oriented image or horizontally-oriented image.

Utilizing the information about the direction of diorama processing together with the detected orientation enables classifying the image as any one of the patterns in FIGS. 5A to 5D. The direction of diorama processing in FIGS. 5A and 5B achieves an effect that a person in the frame area looks like a miniature model because of the diorama effect. On the other hand, the direction of diorama processing in FIGS. 5C and 5D, when a person in the frame area is running, gives a feeling of speed by the contrast with blurred areas on both sides. It is assumed that the user intentionally utilizes these effects by using the function of locking the direction of the diorama effect in a set direction. Therefore, by determining a combination of the detected orientation and the direction setting, a scene can be classified without analyzing the captured image for scene recognition.

When the information about the direction setting is stored in the file header, the diorama effect image processing can be applied based on the information at the time of playback even when RAW image data is selected as the record format or when recording is performed without applying the diorama effect image processing.

Although the above-mentioned exemplary embodiments have specifically been described based on the diorama effect image processing having an effect of blur image quality, the present invention is also applicable to other special effects as long as the image quality is changed in a set direction. The diorama effect image processing is not limited to blur processing but may be processing for changing the hue or brightness.

Although the above-mentioned exemplary embodiments have specifically been described based on a shutter button as a unit for inputting the shooting preparation, the present invention is not limited thereto. For example, the shooting preparation may be input at the touch on a touch panel. In this case, the direction of processing remains unchanged while the touch panel is touched.

Although the above-mentioned exemplary embodiments have specifically been described based on through display, the present invention is not limited thereto but also applicable to a period during which a moving image is actually being recorded in the moving image shooting mode.

Figure 6:
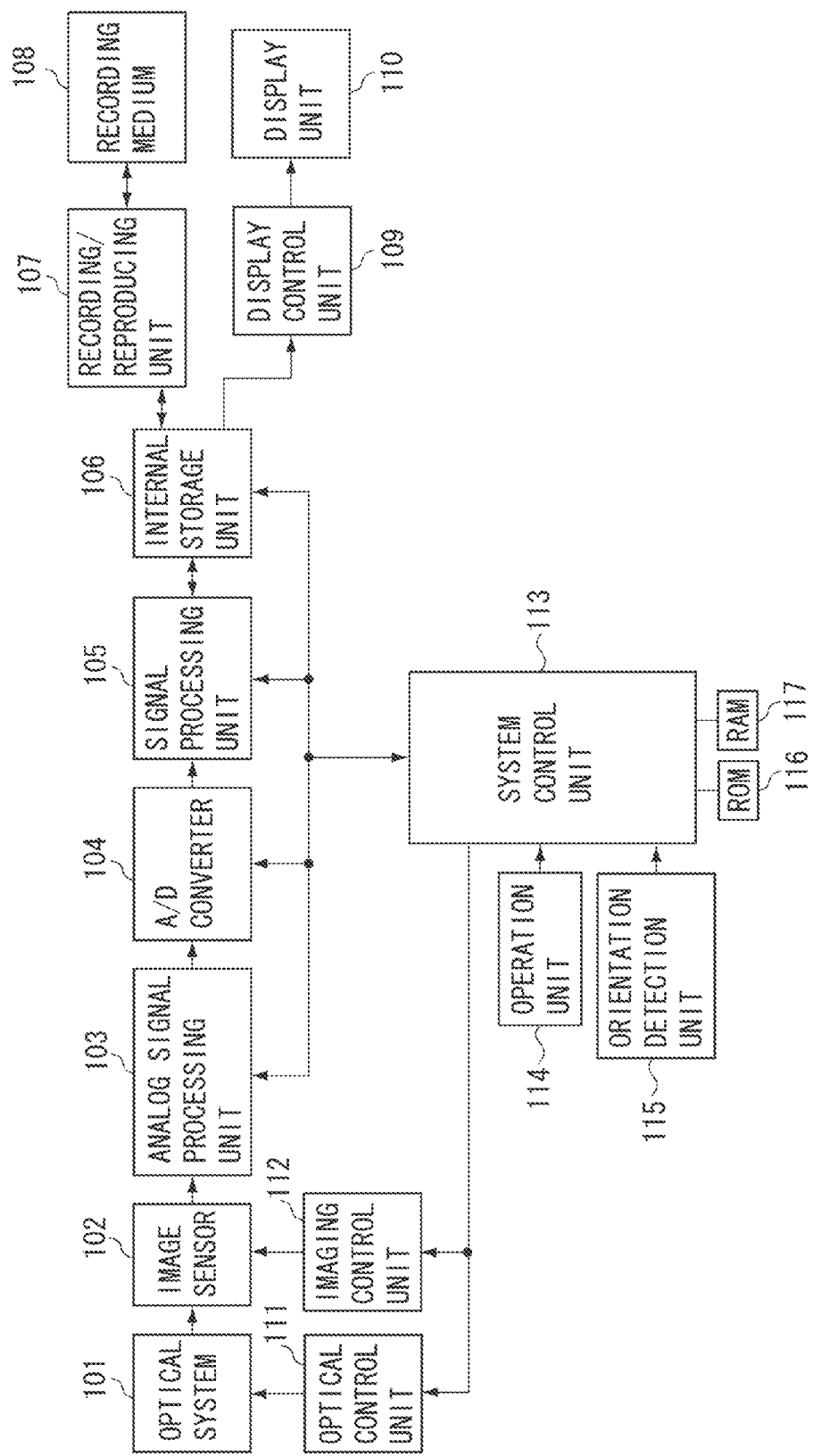
FIG. 6 illustrates a configuration of an imaging apparatus according to a third exemplary embodiment of the present invention.

FIG. 6 illustrates a configuration of an imaging apparatus according to a third exemplary embodiment of the present invention.

An optical system 101 forms an image of a subject by focusing incident light on an image sensor 102. An optical control unit 111 controls the exposure, zoom, focus, optical camera-shake correction, etc., of the optical system 101. The image sensor 102 converts the formed optical image into an electrical signal. An imaging control unit 112 drives the image sensor 102. An analog signal processing unit 103 clamps and increases the gain of an output of the image sensor 102. An analog-to-digital (A/D) converter 104 converts an analog signal to digital form and outputs the digital signal as image data. In the present exemplary embodiment, the optical system 101 to the A/D converter 104 are collectively referred to as an imaging unit. The imaging apparatus according to the present exemplary embodiment is capable of capturing a still image by recording in a recording medium 108 image data of the captured image output from the imaging unit as an independent frame. The imaging apparatus according to the present exemplary embodiment is also capable of capturing a moving image by recording a plurality of frames in succession. A signal processing unit 105 applies image processing (described below) to the captured image of the A/D-converted digital signal to generate an output image. An internal storage unit 106 temporarily stores image data when generating an output image. The signal processing unit 105 reads the image data stored in the internal storage unit 106 in response to an instruction from a system control unit 113 to perform the diorama effect image processing, such as blur image generation, trimming processing, and image mixing processing. The diorama effect image processing will be described in detail below.

A recording/reproducing unit 107 records the generated image data on the recording medium 108. The recording medium 108 may be various types of removable recording media, such as an optical disc recording medium and a semiconductor recording medium. A display unit 110 displays the generated image data as a live image via a display control unit 109. The display unit 110, serving as an electronic viewfinder, performs focusing frame display, in-focus display, out-of-focus warning display, etc., according to execution of a program by the system control unit 113. The system control unit 113, commonly including a central processing unit (CPU), basically controls overall operations of the imaging apparatus. For example, the signal processing unit 105 performs predetermined calculation processing by using the image data obtained by the above-mentioned imaging unit, and the system control unit 113 controls the optical control unit 111 and the imaging control unit 112 based on the result of calculation. The optical control unit 111 controls the optical system 101 to perform automatic focus (AF) control. The optical control unit 111 also controls a diaphragm and shutter, and the imaging control unit 112 controls the electronic shutter of the image sensor 102 to perform automatic exposure (AE) control.

An orientation detection unit 115 detects the orientation of the imaging apparatus by using an acceleration sensor and/or a gyro sensor used for the above-mentioned optical camera-shake correction. The system control unit 113 determines the orientation of the imaging apparatus based on a result of orientation detection output from the orientation detection unit 115, displays the setting information associated with the orientation, and changes the direction input from a cursor key in association with the orientation. An operation unit 114 is provided with a shutter button SW1 for instructing the imaging apparatus to perform preliminary operation before shooting, a shutter button SW2 for instructing the imaging apparatus to perform a shooting operation, and cursor keys for instructing the imaging apparatus of a position subjected to image processing. The system control unit 113 performs AF and AE control by detecting the shutter button SW1 and performs a shooting operation by detecting the shutter button SW2. The configuration of the imaging apparatus illustrated in FIG. 6 is to be considered as an example, and, therefore, the configuration of the imaging apparatus according to the present exemplary embodiment is not limited thereto as long as the imaging apparatus can perform the following operations.

The diorama effect image processing according to the present exemplary embodiment will be described below with reference to FIGS. 7A and 7B.

To achieve a still image with diorama effect, image processing requires a plurality of steps of blur processing with a blur level changed in a predetermined direction. An appropriate relation between an area and direction of blur processing and the composition of a captured image enables obtaining a favorable image having a visible diorama effect. However, if the orientation is changed with the area and direction of blur processing fixed, the direction of blur effect and the composition of the captured image also change, possibly resulting in an image not having an expected diorama effect.

The present exemplary embodiment enables obtaining an image having the expected diorama effect even if the orientation is changed. By performing the diorama effect image processing in any shooting operations including still image capturing, moving image capturing, and live display operations, the present exemplary embodiment enables generating an image having a visible diorama effect. The present exemplary embodiment performs common diorama effect image processing in the above-mentioned shooting operations. However, since the required image quality or frame rate is different for each shooting operation, the diorama effect image processing may be changed for each shooting operation.

Figure 7A:
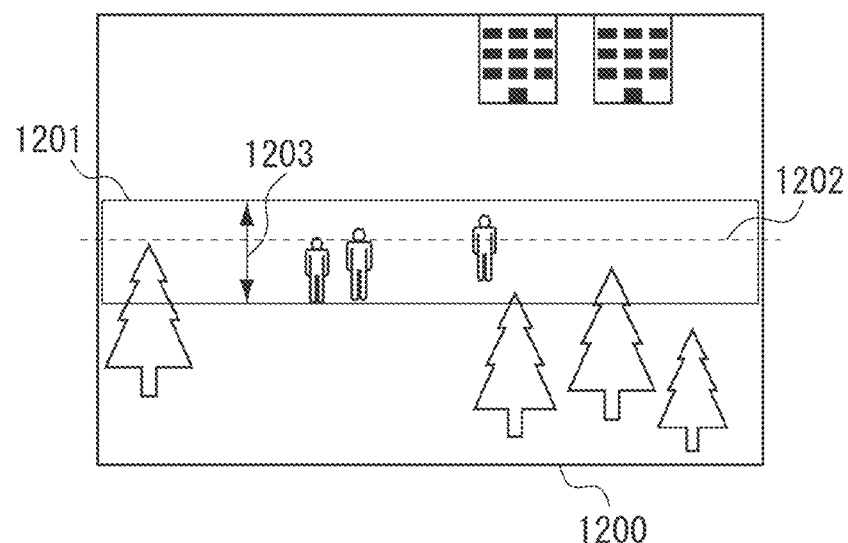
FIG. 7A illustrates a captured image for illustrating diorama effect image processing according to the third exemplary embodiment.
Figure 7B:
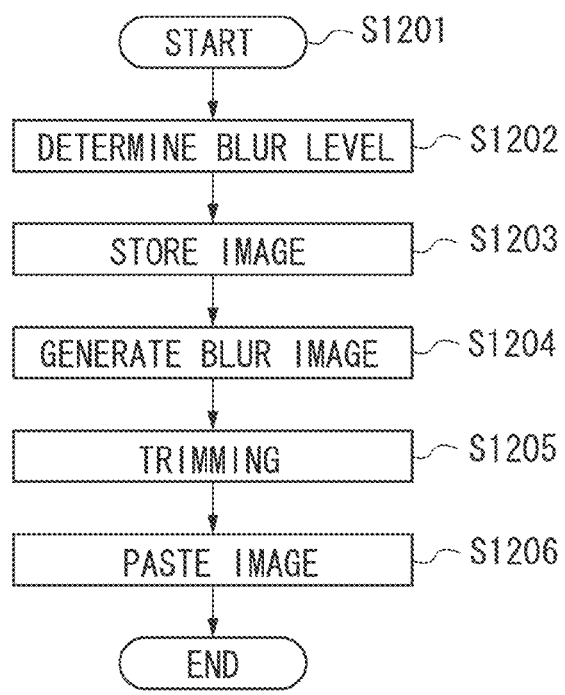
FIG. 7B is a flow chart illustrating the diorama effect image processing.

Referring to FIG. 7A, an image 1200 indicates an entire captured image to be input to the signal processing unit 105. The present exemplary embodiment is directed to obtaining an image having a diorama effect mainly on a person in a scene including buildings, persons, trees, etc. A frame 1201 denotes a focusing range and position specified in the viewing angle of the captured image. Applying blur processing to areas above and below the frame 1201 including persons enables obtaining an image having a diorama effect. The blur level can be set by the signal processing unit 105. Gradational blur processing is also possible.

In the present exemplary embodiment, the frame 1201 is displayed also on the live image displayed on the display unit 110. The vertical position of the frame 1201 is fixed slightly under a centerline 1202. A width 1203 is also fixed. The signal processing unit 105 applies the diorama effect image processing in succession to each frame according to the position and width of the frame 1201, and updates the live image.

A flow of the diorama effect image processing will be described below with reference to FIG. 7B. This operation flow is achieved when the system control unit 113 controls each processing block.

First of all, the system control unit 113 applies development processing such as white balance processing to image data input from the imaging unit to obtain a captured image subjected to processing for one frame. In step S1201, the system control unit 113 starts this operation flow. When starting this operation flow, fixed values of the position and width of the frame 1201 have already been set.

In step S1202, the system control unit 113 determines an amount of blur for areas other than the frame 1201 based on a user-set blur level. In the present exemplary embodiment, the user can select the blur level from "High" and "Low."

In step S1203, the system control unit 113 stores in the internal storage unit 106 image data of the captured image obtained through development processing such as white balance processing. This captured image is the same as one captured in the ordinary mode.

In step S1204, the signal processing unit 105 generates a blur image from the image data of the captured image. The present exemplary embodiment generates a blur image by applying thinning-out processing to the captured image to reduce it and enlarging the reduced image back to the original size. For example, when the user selects blur level "High", the signal processing unit 105 sets the reduction rate of the reduction processing to one eighth. When the user select blur level "Low", the signal processing unit 105 sets the reduction rate of the reduction processing to one fourth. Blur image generation according to the present invention is not limited thereto but may be based on an image captured at an optically out-of-focus position in advance.

In step S1205, the signal processing unit 105 applies trimming processing to the portion of the frame 1201 from the image data of the captured image stored in the internal storage unit 106. In step S1206, the signal processing unit 105 pastes the trimmed image onto the blur image generated in step S1204 through position adjustment, thus obtaining an image having blurred top and bottom portions and a crisp center portion. When pasting the image data of the captured image, the signal processing unit 105 gradually mixes the blur image with the trimmed captured image to make boundary portions therebetween obscure. Specifically, the signal processing unit 105 sets the mixing ratio of the captured image and the blur image at a boundary portion of the frame 1201 to 0:1, and gradually increases the mixing ratio of the captured image as approaching the center line of the frame 1201.

Figure 8A:
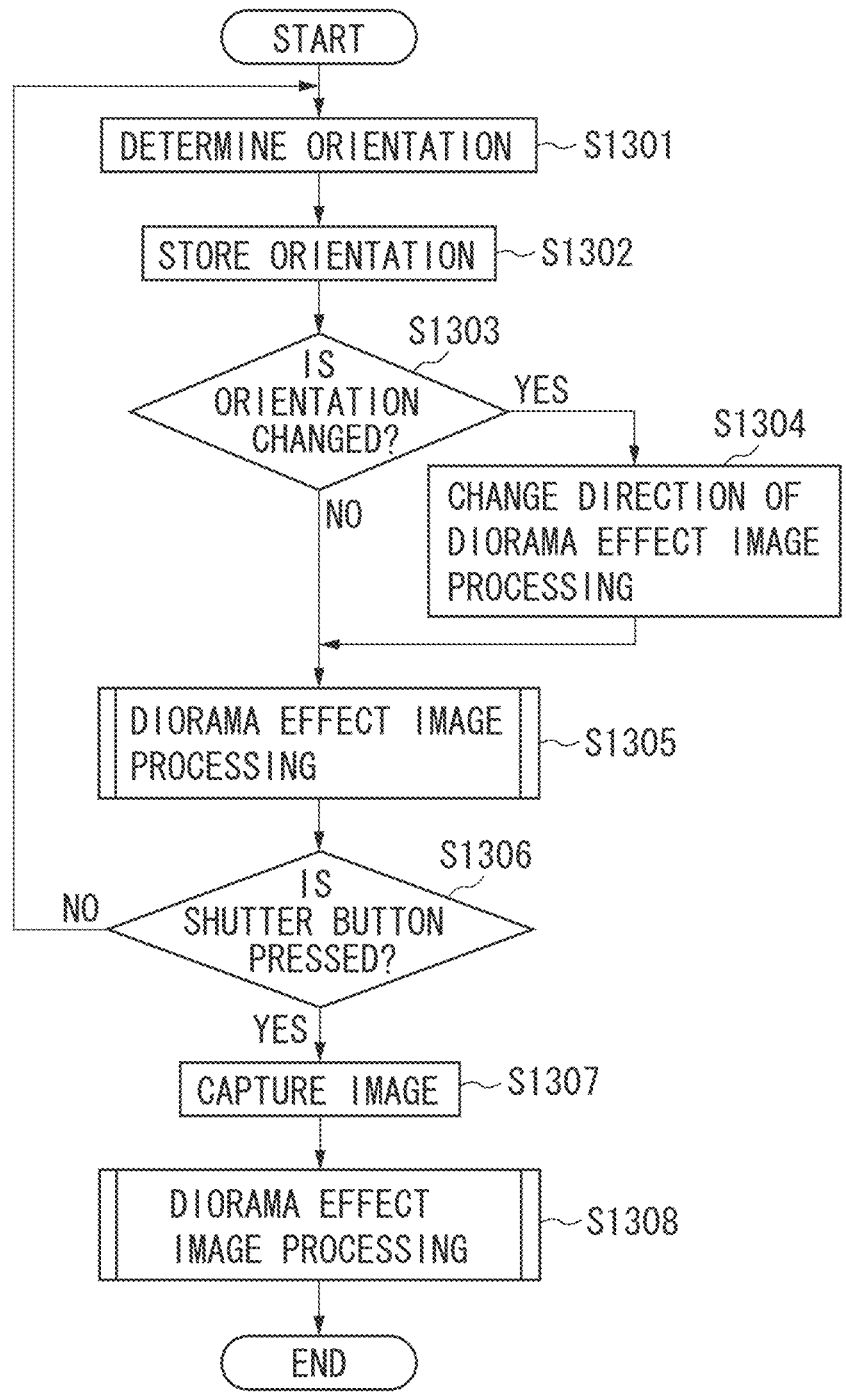
FIG. 8A is a flow chart illustrating a shooting operation according to the third exemplary embodiment.

FIG. 8A is a flow chart illustrating an operation for changing the diorama effect image processing in response to a change in the orientation of the imaging apparatus. This operation flow is achieved when the system control unit 113 controls each processing block. Although the operation flow for changing the diorama effect image processing is also applicable to moving image capturing and still image capturing, an operation flow from live image display to still image capturing will be described below.

When the user selects a diorama effect shooting mode during live image display, the system control unit 113 starts this operation flow. In step S1301, the system control unit 113 determines the orientation of the imaging apparatus based on an output signal from the orientation detection unit 115. The system control unit 113 compares the current orientation detected in step S1301 with the stored former orientation. In step S1302, the system control unit 113 stores the current orientation to use it as a former orientation in the next comparison of orientation. In step S1303, the system control unit 113 determines whether the orientation is changed based on a result of the comparison. When the system control unit 113 determines that the orientation remains unchanged (NO in step S1303), the processing proceeds to step S1305. Otherwise, when the system control unit 113 determines that the orientation is changed (YES in step S1303), the processing proceeds to step S1304.

Figure 8B:
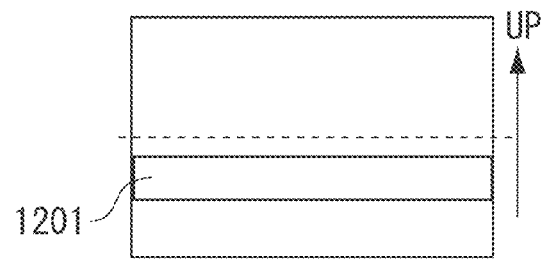
FIGS. 8B to 8D illustrate the diorama effect image processing according to the third exemplary embodiment.
Figure 8C:
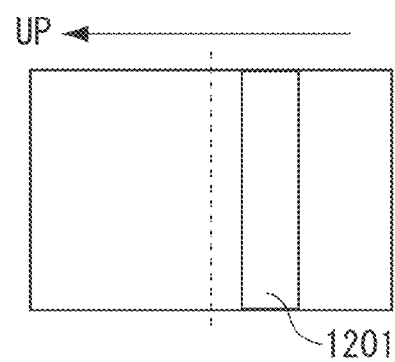
Figure 8D:
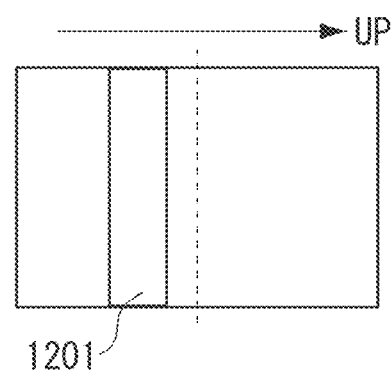

In step S1304, the system control unit 113 changes the display direction of the frame 1201 and the direction of the diorama effect image processing according to the orientation of the imaging apparatus determined in step S1301, as illustrated in FIGS. 8B, 8C, and 8D.

When the orientation remains unchanged (NO in step S1303), the processing proceeds to step S1305. In step S1305, the system control unit 113 performs the diorama effect image processing described in FIG. 7B in the former direction. Otherwise, when the orientation is changed (YES in step S1303), in step S1305, the system control unit 113 performs the diorama effect image processing in the direction changed in step S1304.

In step S1306, the system control unit 113 determines whether the shutter button is pressed. When the system control unit 113 determines that the shutter button is not pressed (NO in step S1306), the processing returns to step S1301. Otherwise, when the system control unit 113 determines that the shutter button is pressed (YES in step S1306), the processing proceeds to step S1307. In step S1307, the system control unit 113 performs still image capturing processing. In step S1308, the system control unit 113 applies the diorama effect image processing described in FIG. 7B to the captured still image. Since higher priority should be given to the image quality than to the frame rate, it is also possible to perform the processing in steps S1204 to S1206, performed using only one blur image, by using a plurality of blur images to obtain a still image having a larger diorama effect.

Figure 9A:
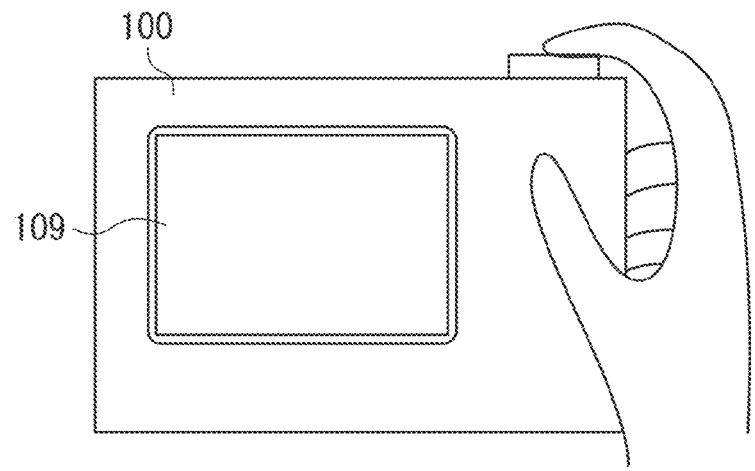
FIGS. 9A to 9D schematically illustrate a relation between the orientation of the imaging apparatus and the diorama effect image processing according to the third exemplary embodiment of the present invention.

Processing for changing the direction of the diorama effect image processing in step S1304 in FIG. 8A will be described in detail below. FIG. 8B illustrates an image having a diorama effect displayed on the display unit 110 when the user holds the imaging apparatus at the normal orientation (horizontal (landscape) orientation). Similar to the descriptions with reference to FIG. 7A, the frame 1201 shows a focusing range and position. The normal orientation is an orientation with which the user holds the imaging apparatus as illustrated in FIG. 9A.

Figure 9B:
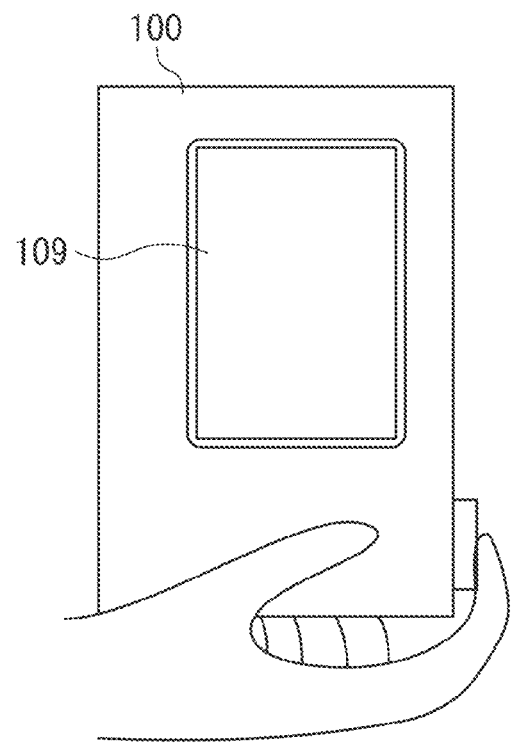

FIG. 8C illustrates an orientation (vertical (portrait) orientation) at which the user holds the imaging apparatus with the grip oriented downward and the imaging apparatus is rotated clockwise by 90 degrees from the normal orientation. FIG. 9B illustrates that the direction of diorama processing and the direction of the frame 1201 are rotated counterclockwise by 90 degrees from the normal orientation.

FIG. 8D illustrates an orientation with which the imaging apparatus is rotated counterclockwise by 90 degrees from the normal orientation. In this case, there is a symmetrical relation between the positions of the frame 1201 in FIGS. 8C and 8D.

When the user fixes the frame even after rotating the imaging apparatus clockwise or counterclockwise by 90 degrees, an expected diorama effect may not be acquired because the composition changes from that of the image 1200 in FIG. 7A, i.e., the frame is displayed in the vertical direction in the diorama effect processing. In the present exemplary embodiment, on the other hand, the direction of the frame is rotated as illustrated in FIGS. 8C and 8D in response to a change in the orientation of the imaging apparatus. This retains the direction of the diorama effect before rotation even if the composition changes, thus obtaining a favorable image.

In a fourth exemplary embodiment of the present invention, the user can set a vertical position and width of the frame 1201 via the operation unit 114 during live image display. The signal processing unit 105 performs the diorama effect image processing according to a set position and width of the frame 1201, and updates the live image.

In this case, when the direction of the diorama effect image processing changes in response to a change in the orientation of the imaging apparatus, it is desirable to subsequently display an image with diorama effect based on the position and width of the frame 1201 set by the user.

A method for setting the frame 1201 (a focusing range and position) when the imaging apparatus is rotated clockwise by 90 degrees as illustrated in FIG. 9B from the normal orientation in FIG. 9A will be described below with reference to FIGS. 9A to 9D. Descriptions on a case where the imaging apparatus is rotated counterclockwise by 90 degrees will be omitted since a similar configuration is applicable to both clockwise and counterclockwise rotations. In the descriptions below, an orientation of the imaging apparatus rotated clockwise or counterclockwise by 90 degrees from the normal orientation is referred to as vertical orientation.

Figure 9C:
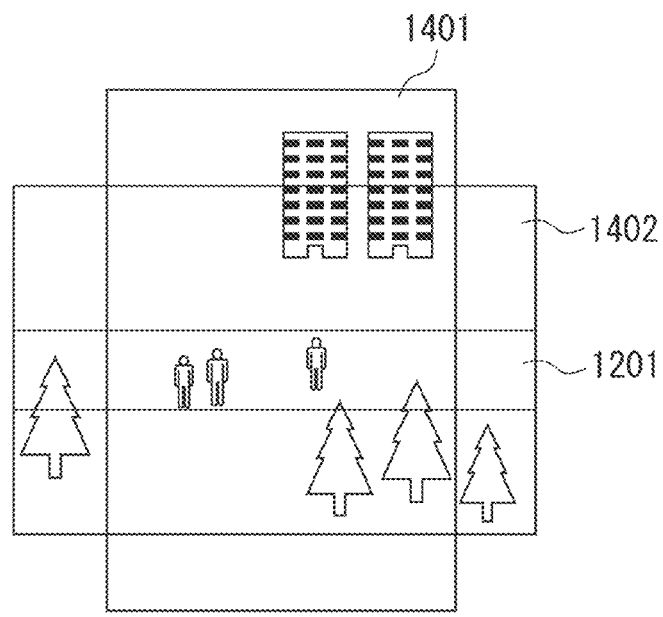
Figure 9D:
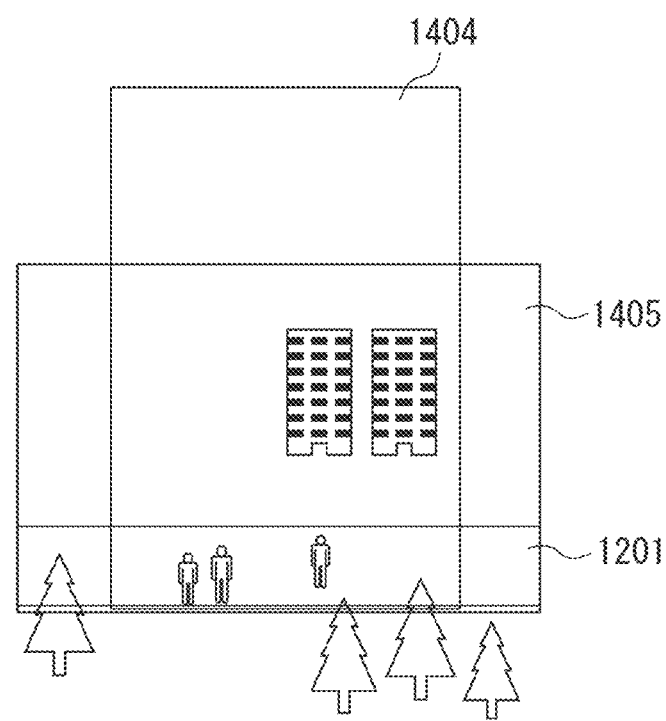

To shoot a scene having a diorama effect illustrated in FIG. 9C, similar to the third exemplary embodiment, the user shoots the scene with either the normal or vertical orientation. To set a focusing range and position (frame 1201) targeting a person who is a main subject, the signal processing unit 105 needs to reflect user specification to set almost the same width, regardless of the normal orientation 1402 or vertical orientation 1401. To maintain the balance of the composition, the signal processing unit 105 sets the position of the frame 1201 so that its vertical size is within a fixed range, regardless of the normal orientation 1402 or vertical orientation 1401.

FIGS. 10A to 10D illustrate examples of the above-mentioned settings in response to a change in the orientation of the imaging apparatus.

Figure 10A:
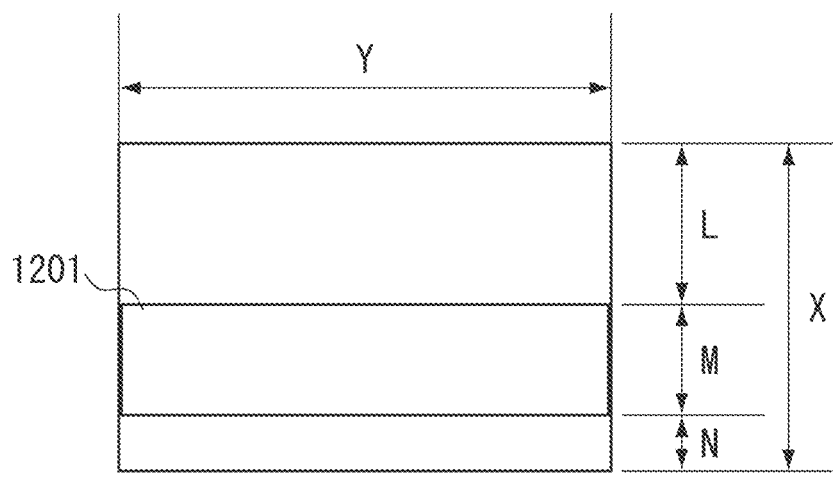
FIGS. 10A to 10D schematically illustrate a relation between the orientation of the imaging apparatus and the diorama effect image processing.

FIG. 10A illustrates a setting of a width M of the frame 1201 in the case of a composition with the normal orientation 1402 in FIG. 9C. When the user changes the orientation of the imaging apparatus from the normal orientation in FIG. 10A to the vertical orientation in FIG. 10B, the signal processing unit 105 sets a width P of the frame 1201 with the vertical orientation in FIG. 10B according to the width M with the normal orientation in FIG. 10A. In this case, the ratio of the width M to the width X in the vertical direction of the captured image equals the ratio of the width P to the width Y in the horizontal direction of the captured image. Using a similar ratio relation, the signal processing unit 105 sets widths O and Q with the vertical orientation in FIG. 10B according to widths L and N with the normal orientation in FIG. 10A. Also when the user changes the orientation of the imaging apparatus from the vertical orientation in FIG. 10B to the normal orientation in FIG. 10A, the signal processing unit 105 sets the widths L, M, and N according to the widths O, P, and Q.

Figure 10B:
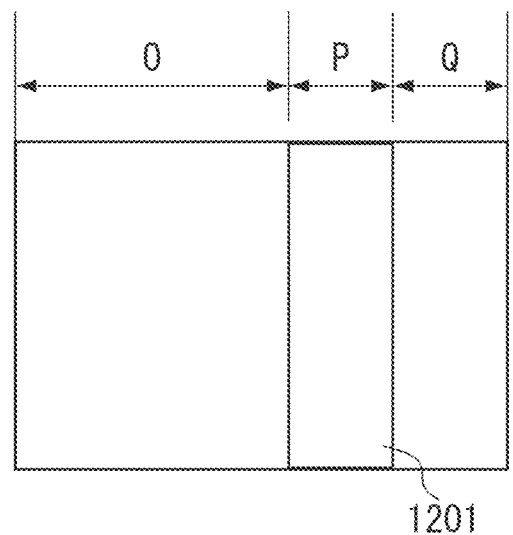
Figure 10C:
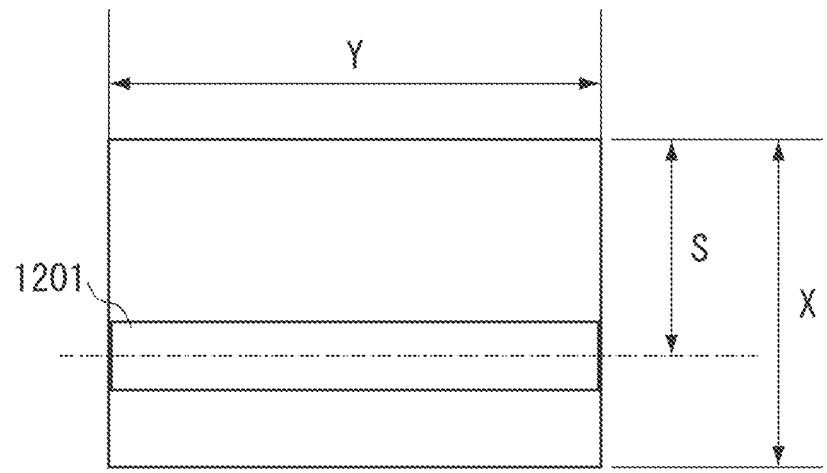

FIG. 10C illustrates an exemplary position setting of the frame 1201 with the normal orientation 1402 to a center position S in the case of the composition with the normal orientation 1402 in FIG. 9C. The signal processing unit 105 sets the center position S of the frame 1201 with the normal orientation in FIG. 10C in terms of a ratio to the height X of the entire screen. When the user changes the orientation of the imaging apparatus from the horizontal orientation in FIG. 10C to the vertical orientation in FIG. 10D, the signal processing unit 105 can easily calculate a center position U of the frame 1201 from a width Y of the entire screen by using a formula $U = Y \times S/X$. When the user changes the orientation of the imaging apparatus from the vertical orientation in FIG. 10D to the normal orientation in FIG. 10C, the signal processing unit 105 calculates the center position S by using a formula $S = X \times U/Y$. Although the center positions U and S are employed in terms of a ratio, these positions may be calculated by the number of pixels from the top end or center of the screen.

Figure 10D:
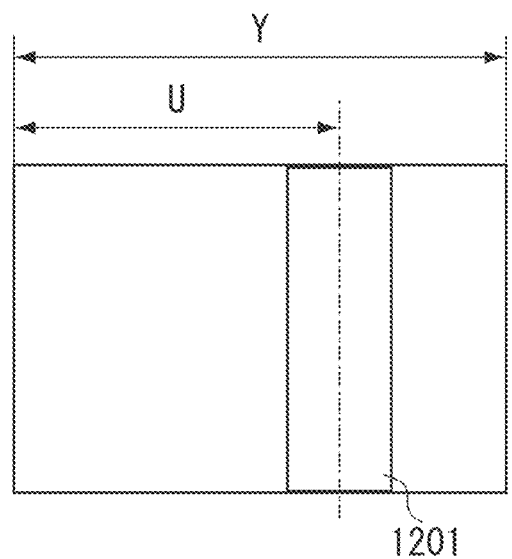

A method for setting the frame 1201 has been described separately for a width and position, when the width M in FIG. 10A is set from the center position S of the frame 1201 in FIG. 10C, the width P in FIG. 10B can be set from the center position U in FIG. 10D. Suppose that, as illustrated in FIG.

9D, the user sets the frame 1201 in the vicinity of the bottom end of the screen with the vertical orientation 1404, and changes the orientation of the imaging apparatus to the normal orientation 1405. In this case, when the user sets a large width P, the signal processing unit 105 can associate the center position U with the center position S of the frame 1201 but a frame range P does not fit into the composition. Therefore, when a frame is set at a position contacting the bottom end of the screen, the relation of the center position is not employed as it is even when the user changes the orientation of the imaging apparatus. The signal processing unit 105 sets a center position so that the frame is set at the bottom end position of the screen with the frame width maintained. Although not illustrated, the signal processing unit 105 performs similar processing when the user sets the frame 1201 in the vicinity of the top end of the screen.

As described above, the present exemplary embodiment enables the user to set a position and width of a frame subjected to the diorama effect image processing, and to obtain an image having an expected diorama effect even if the orientation of the imaging apparatus is changed.

Although, in the above-mentioned exemplary embodiments, the diorama effect image processing has specifically been described based on live display and still image recording, the present invention is not limited thereto but also applicable to live display and recording of a moving image.

Although, in the above-mentioned exemplary embodiments, the term "diorama effect image processing" refers to special effects for convenience, the present invention is also applicable to processing of other special effects as long as a captured image is mixed with one or more blur images given directivity in terms of different areas.

Although, in the above-mentioned exemplary embodiments, the present invention is applied to an imaging apparatus, the application is not limited thereto. The present invention maybe implemented in a personal computer, a digital television, and other image processing apparatuses capable of inputting a captured image from an external imaging apparatus. In this case, the signal processing unit 105 determines the orientation of the imaging apparatus based on the information about the detected orientation included in the header of an image file of the captured image, and performs the diorama effect image processing according to the orientation. In the case of a personal computer, the present invention is achieved by acquiring application software for executing the steps in FIG. 8A from a storage medium such as a CD-ROM or a server on a network, and then installing the application software in the personal computer.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
a processor; and
memory storing computer executable instructions that, when executed by the processor, cause the processor to:
sequentially display an image captured by an imaging unit;
apply, at an image processing unit, a special effect in a set direction on the captured image to the captured image for displaying;
detect an orientation of the image processing apparatus; and
set the direction of the special effect applied by the image processing unit,
wherein, in a case where a predetermined operation is performed, the setting of the direction of the special effect is retained even in a case where the detected orientation changes, and in a case where the predetermined operation is not performed, the setting of the direction of the special effect applied by the image processing unit is changed according to the detected orientation, and
wherein the predetermined operation is to instruct a shooting preparation by half pressing a shutter member.

2. The image processing apparatus according to claim 1, wherein a frame indicating the direction of the special effect is changed according to the detected orientation.

3. The image processing apparatus according to claim 1, wherein the computer executable instructions, when executed, further cause the processor to record a still image and to record the orientation of the image processing apparatus and the direction of the special effect of the captured image.

4. The image processing apparatus according to claim 1, wherein the special effect includes blur processing in the set direction.

5. The image processing apparatus according to claim 1, wherein a position or a size of an area is determined according to the detected orientation.

6. The image processing apparatus according to claim 1, wherein the image processing unit performs blur processing as the special effect that generates an image comprising a first area and a second area lying toward the set direction, wherein an image of the second area is blurrier than an image of the first area.

7. The image processing apparatus according to claim 1, wherein after a detected orientation is changed, a position and a size of an area in which the special effect is not applied is set based on a position and a size of the area set before the detected orientation is changed.

8. The image processing apparatus according to claim 1, wherein a width of an area is set after a detected orientation is changed so that a ratio of a height of the area to a height of a displayed image in a horizontal orientation equals to a ratio of a height of the area before the detected orientation is changed to a height of the displayed image in a vertical orientation.

9. The image processing apparatus according to claim 1, wherein a center position of an area is set in which the special effect is not applied after a detected orientation is changed so that a ratio of a length between the center position of the area and an edge of the displayed image to a height of a displayed image in a horizontal orientation equals to a ratio of a length between a center position of the area and an edge of the displayed image before the detected orientation is changed to a height of a displayed image in a vertical orientation.

10. The image processing apparatus according to claim 1, further comprising the imaging unit.

11. The image processing apparatus according to claim 1, further comprising:
an operating unit configured to receive user's operation, wherein the operating unit performs an operation input.

12. The image processing apparatus according to claim 1, wherein the predetermined operation is performed by pressing a shutter button by a user.

13. An image processing apparatus comprising:
a processor; and
memory; storing computer executable instructions that, when executed by the processor, cause the processor to:
perform blur processing that generates an image that comprises a first area and a second area lying toward a first direction or a second direction on the generated image, wherein an image of the second area is blurrier than an image of the first area;
display the generated image on a displaying unit;
set the first direction or the second direction; and
set a size of the first area in the first direction or the second direction,
wherein the setting of the size of the first area in the first direction is changed based on the size of the first area in the second direction and the size of the generated image,
wherein, in a case where a predetermined operation is performed, the setting of the direction of the blur processing is retained even in a case where a detected orientation of the image processing apparatus changes, and in a case where the predetermined operation is not performed, the setting of the direction of the blur processing is changed according to the detected orientation, and
wherein the predetermined operation is to instruct a shooting preparation by half pressing a shutter member.

14. The image processing apparatus according to claim 13, wherein at least one of a width and a position of the first area in the first direction or the second direction are set, as a setting of the first area.

15. The image processing apparatus according to claim 13, wherein the setting of the width of the first area in the first direction or the second direction is changed after the change of the setting of the direction, based on the width of the first area before the change of the setting of the direction in a case where the setting of the direction is changed.

16. The image processing apparatus according to claim 13, wherein the setting of the position of the first area is changed after the change of the setting of the direction, based on the position of the first area before the change of the setting of the direction in a case where the setting of the direction is changed.

17. The image processing apparatus according to claim 13, wherein the setting of the first area is changed before the change of the setting of the direction in a case where the setting of the direction is changed, and the setting of the first area is changed before the change of the setting of the direction based on the width and the height of the image.

18. The image processing apparatus according to claim 13, wherein, in a case where the setting of the direction is changed to the second direction from the first direction, a width of the first area is set in the second direction after the change so that a ratio between a width of the first area in the first direction and a width of the generated image in the first direction corresponds to the ratio between a width of the first area in the second direction and a width of the generated image in the second direction.

19. The image processing apparatus according to claim 13, wherein, in a case where the setting of the direction is changed to the second direction from the first direction, a position of the first area in the second direction is set so that a ratio of the width of the image in the first direction and a length between a center position of the first area and an edge of the generated image in the first direction corresponds to a ratio of a width of the generated image in the second direction and a length between a center position of the first area and an edge of the generated image in the second direction.

20. The image processing apparatus according to claim 13, wherein the computer executable instructions, when executed, further cause the processor to:
detect the orientation of the image processing apparatus, wherein the first or the second direction is set based on the detected orientation of the image processing apparatus.

21. The image processing apparatus according to claim 13, wherein the blur processing is performed to make blur in a phased manner in the first or the second direction.

22. The image processing apparatus according to claim 13, wherein the computer executable instructions, when executed, further cause the processor to:
display, on the displaying unit, images to which the blur processing is performed.

23. The image processing apparatus according to claim 22, wherein the displaying unit displays a frame corresponding to the first area of the displayed image.

24. The image processing apparatus according to claim 22, wherein the displaying unit is capable of sequentially displaying the images to which the blur processing is performed to the images sequentially captured by an imaging unit.

25. The image processing apparatus according to claim 22, wherein the computer executable instructions, when executed, further cause the processor to:
record the image to which the blur processing is performed, wherein blur processing, which is performed to an image output to the displaying unit, is configured to be a processing more simple than the blur processing performed to the recorded image.

26. The image processing apparatus according to claim 13, wherein the computer executable instructions, when executed, further cause the processor to:
receive, at an operating unit, a user's operation, wherein the setting of the first area is set based on instruction from the operating unit.

27. The image processing apparatus according to claim 13, wherein the first direction is a horizontal direction on the generated image and the second direction is a vertical direction on the generated image.

28. The image processing apparatus according to claim 13, wherein, in a case where the setting of the direction is changed, the setting of the size of the first area is changed based on the size of the first area before the change of the setting of the direction.

29. An image processing apparatus comprising:
a processor; and
memory storing computer executable instructions that, when executed by the processor, cause the processor to:
perform blur processing that generates an image that comprises a first area and a second area lying toward a first direction or a second direction on the generated image, wherein an image of the second area is blurrier than an image of the first area;
set a first orientation or a second orientation; and
set a size of the first area;
wherein, in a case where the setting of the orientation is changed, the setting of a size of the second area is changed after the change of the setting of the orientation, based on the setting of the size of the second area before the change of the setting of the orientation, wherein, in a case where a predetermined operation is performed, a setting of a direction of the blur processing on the generated image is retained even in a case where a detected orientation of the image processing apparatus changes, and in a case where the predetermined operation is not performed, the setting of the direction of the blur processing is changed according to the detected orientation, and wherein the predetermined operation is to instruct a shooting preparation by half pressing a shutter member.

30. The image processing apparatus according to claim 29, wherein the computer executable instructions, when executed, further cause the processor to:

detect an orientation of the image processing apparatus, wherein the first or the second direction is set based on the detected orientation.

31. A method for controlling an image processing apparatus, the method comprising:

sequentially displaying an image captured by an imaging unit;

applying a special effect in a set direction on the captured image to the captured image for displaying;

detecting an orientation of the image processing apparatus;

setting the direction of the special effect according to the detected orientation;

retaining, in a case where a predetermined operation is performed, the setting of the direction of the special effect even in a case where the detected orientation changes, and changing, in a case where the predetermined operation is not performed, the setting of the direction of the special effect according to the detected orientation, wherein the predetermined operation is to instruct a shooting preparation by half pressing a shutter member.

32. An image processing method for controlling an image processing apparatus, the method comprising:

performing blur processing that generates an image that comprises a first area and a second area lying toward a first direction or a second direction on the generated image, wherein an image of the second area is blurrier than an image of the first area;

setting the first direction or the second direction; and setting a size of the first area;

wherein, in a case where the setting of the direction is changed, the setting of the size of the first area after the change of the setting of the direction is changed by changing the size of the first area before the change of the setting of the direction based on the size of the generated image, wherein, in a case where a predetermined operation is performed, the setting of the direction of the blur processing is retained even in a case where a detected orientation of the image processing apparatus changes, and in a case where the predetermined operation is not performed, the setting of the direction of the blur processing is changed according to the detected orientation, and wherein the predetermined operation is to instruct a shooting preparation by half pressing a shutter member.

33. The image processing method according to claim 32, further comprising:

detecting an orientation of the image processing apparatus; and setting the first or the second direction based on the detected orientation.

34. An image processing method for controlling an image processing apparatus, the method comprising:

performing blur processing that generates an image that comprises a first area and a second area lying toward a first direction or a second direction on the generated image, wherein an image of the second area is blurrier than an image of the first area;

setting the first direction or the second direction; and setting a size of the first area;

wherein, in a case where the setting of the direction is changed, a setting of a size of the second area after the change of the setting of the direction is changed by changing the size of the first area before the change of the setting of the direction based on the size of the generated image, wherein, in a case where a predetermined operation is performed, the setting of the direction is retained even in a case where a detected orientation of the image processing apparatus changes, and in a case where the predetermined operation is not performed, the setting of the direction is changed according to the detected orientation, and wherein the predetermined operation is to instruct a shooting preparation by half pressing a shutter member.

35. The image processing method according to claim 34, further comprising:

detecting an orientation of the image processing apparatus; and setting the first or the second direction based on the detected orientation.

36. An image capturing apparatus comprising:

a processor; and memory storing computer executable instructions that, when executed by the processor, cause the processor to:

capture a plurality of images;

sequentially display, on a displaying unit, the captured images;

perform blur processing to make blur in a phased manner in a set direction on the captured images;

detect an orientation of the image capturing apparatus; and set the direction of the applied blur processing according to the detected orientation of the image capturing apparatus, wherein, in a case where a predetermined operation is performed, the setting of the direction is retained even in a case where the detected orientation changes, and in a case where the predetermined operation is not performed, the setting of the direction applied by an image processing unit is changed according to the detected orientation, and wherein the predetermined operation is to instruct a shooting preparation by half pressing a shutter member.

37. An image capturing apparatus comprising:

a processor; and memory storing computer executable instructions that, when executed by the processor, cause the processor to:

capture a plurality of images;

sequentially display, on a displaying unit, the captured images;

perform blur processing that generates, from a captured image, an image that comprises a first area and a second area lying toward a first direction or a second direction on the captured image, wherein an image of the second area is blurrier than an image of the first area;

set the first direction or the second direction; and set a width and a position of the first area;

wherein the setting of the width and the position of the first area is changed in the first direction based on the size of the first area in the second direction and a size of the displayed image, wherein, in a case where a predetermined operation is performed, the setting of the direction is retained even in a case where a detected orientation of the image capturing apparatus changes, and in a case where the predetermined operation is not performed, the setting of the direction is changed according to the detected orientation, and wherein the predetermined operation is to instruct a shooting preparation by half pressing a shutter member.

38. The image processing apparatus according to claim 37, wherein, in a case where the setting of the direction is changed to the second direction from the first direction, a width of the first area is set in the second direction so that a ratio between a width of the first area in the first direction and a width of the generated image in the first direction corresponds to a ratio between a width of the first area in the second direction and a width of the generated image in the second direction.

39. The image processing apparatus according to claim 37, wherein, in a case where the setting of the direction is changed to the second direction from the first direction, a position of the first area is set in the second direction so that a ratio of the width of the generated image in the first direction and a length between a center position of the first area and an edge of the generated image in the first direction corresponds to a ratio of a width of the generated image in the second direction and a length between a center position of the first area and an edge of the generated image in the second direction.

40. A method for controlling an image processing apparatus including an imaging unit capable of capturing an image, the method comprising:

sequentially displaying an image captured by the imaging unit;

applying a special effect in a set direction on the captured image for displaying;

detecting an orientation of the image processing apparatus;

setting the direction of the special effect according to the detected orientation; and retaining, in a case where a predetermined operation is performed, the setting of the direction of the special effect even in a case where the detected orientation changes, and changing, in a case where the predetermined operation is not performed, the setting of the direction of the special effect in a case where the detected orientation changes, wherein the predetermined operation is to instruct a shooting preparation by half pressing a shutter member.

41. An image processing method for controlling an image processing apparatus, the method comprising:

performing blur processing that generates an image that comprises a first area and a second area lying toward a first direction or a second direction on the generated image, wherein an image of the second area is blurrier than an image of the first area;

setting the first direction or the second direction; and setting a size of the first area;

wherein the setting of the size of the first area in the first direction is changed based on the size of the first area in the second direction and the size of the generated image, wherein, in a case where a predetermined operation is performed, the setting of the direction is retained even in a case where a detected orientation of the image processing apparatus changes, and in a case where the predetermined operation is not performed, the setting of the direction is changed according to the detected orientation, and wherein the predetermined operation is to instruct a shooting preparation by half pressing a shutter member.

* * * * *